United States Patent
Alam (10) Patent No.: US 9,094,466 B2
(45) Date of Patent: Jul. 28, 2015

(54) MAINTAINING CACHES OF OBJECT LOCATION INFORMATION IN GATEWAY COMPUTING DEVICES USING MULTICAST MESSAGES

(75) Inventor: Shahid Alam, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 424 days.

(21) Appl. No.: 13/082,223

(22) Filed: Apr. 7, 2011

(65) Prior Publication Data

US 2012/0259821 A1 Oct. 11, 2012

(51) Int. Cl.
G06F 17/30 (2006.01)
H04L 29/08 (2006.01)
H04L 12/18 (2006.01)

(52) U.S. Cl.
CPC ........ *H04L 67/288* (2013.01); *G06F 17/30153* (2013.01); *H04L 67/2852* (2013.01); *H04L 12/18* (2013.01)

(58) Field of Classification Search
CPC ............... G06F 17/30153; G06F 17/30156; G06F 17/30203; G06F 17/30233
USPC ........ 707/610, 611, 613, 617, 620, 624, 626, 707/634, 636, 640, 661, 674, 693, 999.204
See application file for complete search history.

(56) References Cited

U.S. PATENT DOCUMENTS

| 6,721,862 | B2 | 4/2004 | Grant et al. | |
|---|---|---|---|---|
| 7,539,710 | B1 | 5/2009 | Haustein et al. | |
| 2010/0070715 | A1 | 3/2010 | Waltermann et al. | |
| 2010/0114919 | A1 | 5/2010 | Sandhu | |
| 2010/0274772 | A1* | 10/2010 | Samuels | 707/693 |
| 2010/0333116 | A1 | 12/2010 | Prahlad et al. | |
| 2011/0080921 | A1* | 4/2011 | Ban | 370/431 |
| 2011/0307447 | A1* | 12/2011 | Sabaa et al. | 707/637 |
| 2012/0009898 | A1* | 1/2012 | Coleman et al. | 455/411 |
| 2012/0089606 | A1* | 4/2012 | Eshwar et al. | 707/737 |

OTHER PUBLICATIONS

"Caching Architectures." Available at http://csis.bits-pilani.ac.in/faculty/tsbs/Main/webcaching/Pres_ISem34/Himani_Shiv_Anju/pres1/ppt2.ppt. downloaded Apr. 7, 2011.
Gomez et al., "DHTCache: A Distributed Service to Improve the Selection of Cache Configurations within a Highly-Distributed Context." Globe 2009.
Wouter Kolff, "VCE and Private Cloud." Available at http://www.openline.nl/IManager/Download/137/3530/417/93474/417_93474_s0Ki_storage_strategies_workshop-VCE.ppt, EMC 2009.

* cited by examiner

*Primary Examiner* — Syling Yen
(74) *Attorney, Agent, or Firm* — Hewlett-Packard Patent Department (57) ABSTRACT

Example embodiments relate to maintaining caches of object location information in gateway computing devices using multicast messages. In example embodiments, upon updating a cache with an object identifier and a corresponding object location, a gateway computing device may transmit an update message using a simple multicast transport protocol to a plurality of other gateway computing devices. In contrast, upon deleting an object from a cache, the gateway computing device may transmit a delete message using a reliable multicast transport protocol to the plurality of other gateway computing devices.

12 Claims, 6 Drawing Sheets

MAINTAINING CACHES OF OBJECT LOCATION INFORMATION IN GATEWAY COMPUTING DEVICES USING MULTICAST MESSAGES

BACKGROUND

In the modern global economy, digital information has evolved into a valuable resource of fundamental importance. Modern storage and archival systems allow for individuals and businesses to capitalize on the value of this information by providing massive amounts of storage, while ensuring that the stored information remains easily-accessible. To guarantee that these systems meet the needs of customers, information technology businesses are constantly striving to improve the reliability, capacity, speed, and usability of their systems.

BRIEF DESCRIPTION OF THE DRAWINGS

The following detailed description references the drawings, wherein.

DETAILED DESCRIPTION

As described above, the reliability, capacity, speed, and usability of storage systems is important in ensuring a satisfactory customer experience. Given that the amount of information stored in such systems can measure in the order of terabytes or even petabytes of data, the efficiency of these systems is of critical importance in providing maximal performance at a minimal cost.

One technique used to increase the efficiency of a storage system is known as "deduplication." Because storing multiple copies of the same object unnecessarily consumes storage space, a deduplication process ensures that a given object is only stored in the system once. For example, prior to storing an object in the system, a cryptographic hash or other identifier may be generated for the object. The system will then only store the object when the identifier is not already present in storage. Such a deduplication procedure is relatively simple to implement in a small storage system. However, in more complex architectures including a large number of components, deduplication can cause performance problems and can eventually become cost-prohibitive to implement in the largest of systems.

Example embodiments disclosed herein increase the performance of a storage system including a series of gateway devices that exchange data with a corresponding series of storage nodes, such that deduplication procedures can be implemented, even in large distributed architectures. In the gateway-based storage system described herein, a user or application desiring to store, access, or delete data interacts with one or more of the gateways, which in turn interact with the storage nodes to execute the appropriate storage operations. In this manner, each gateway device serves as an intermediary between the requesting device and the storage nodes.

In order to increase the performance of such a storage system and to enable efficient object deduplication, example embodiments utilize a cache of object location information included in each gateway device. Each cache entry may include, for example, an identifier of an object stored in one of the storage nodes and object location information that points to the storage location of the object in the corresponding storage node. Upon receipt of an access request including an object identifier that is referenced in the cache, the gateway device may quickly pinpoint the physical storage location of the object without the need for a lookup operation.

To ensure coherency between the gateway caches, example embodiments exchange multicast messages between the components of the system. In the gateway-based storage system described herein, cache misses impose only a slight performance impact, since the object identifier can be located relatively quickly using a lookup operation. As a result, when new data is stored in a storage node or when a cache is updated with a new entry, the gateway device transmits a cache update message to the caching gateway devices using a simple multicast transport protocol. In contrast, a false positive match can result in a more significant performance impact, as the gateway will attempt to access a non-existent object or access an object at an incorrect location. Therefore, when data is removed from a gateway cache or storage node, the gateway device or storage node transmits a delete message to the caching gateway devices using a reliable multicast transport protocol, which imposes a higher overhead than simple multicast messages.

In this manner, example embodiments disclosed herein capture the performance benefits of a gateway-based storage system including caches, while also minimizing the impact of transmitting messages used to maintain cache coherency. In addition, by using the caches of object identifiers, the gateways may implement an object deduplication procedure to avoid storage of duplicate objects with a minimal performance impact. Additional embodiments and advantages of such embodiments will be apparent to those of skill in the art upon reading and understanding the following description.

Figure 1:
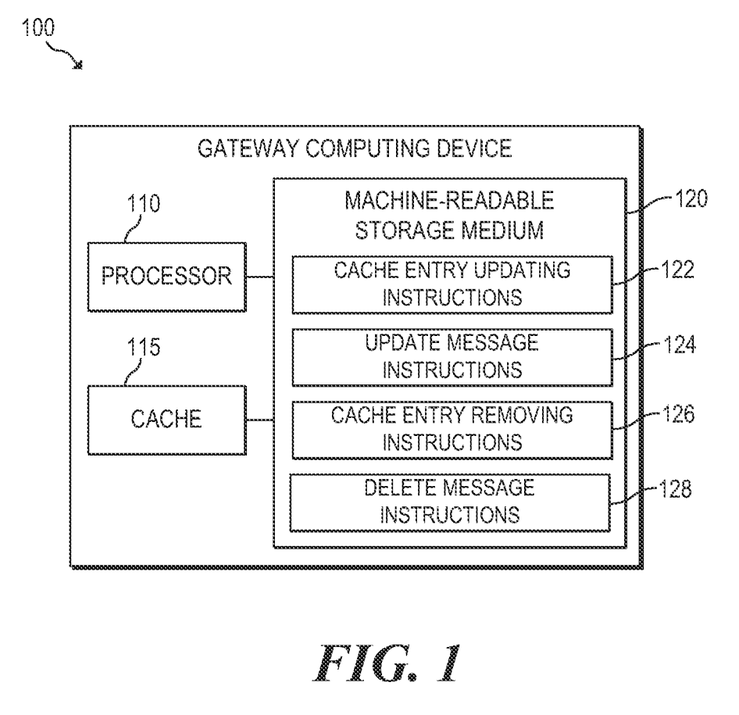
FIG. 1 is a block diagram of an example gateway computing device including a cache of object location information.

Referring now to the drawings, FIG. 1 is a block diagram of an example gateway computing device 100 including a cache 115 of object location information. In the implementation of FIG. 1, client computing device 100 includes processor 110, cache 115, and machine-readable storage medium 120.

Gateway computing device 100 may be operated as a particular node within a distributed storage system. For example, gateway computing device 100 may correspond to one of the gateways 210, 215, 220 of system 200, described further below in connection with FIG. 2A. Similarly, gateway computing device 100 may correspond to an access gateway 260 of system 250, described further below in connection with FIG. 2B. Regardless of the particular implementation, gateway computing device 100 may receive instructions to access data from and/or to store data in one of a number of storage nodes in communication with gateway 100. As described below, gateway 100 may include a cache 115 for use in quickly accessing objects stored in the storage nodes and may exchange messages with other gateways to ensure consistency between cache 115 and caches included in the other gateways.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126, 128 to implement the procedure for receiving and transmitting cache update and delete messages, as described below. As an alternative or in addition to retrieving and executing instructions, processor 110 may include one or more electronic circuits that include a number of electronic components for performing the functionality of one or more of instructions 122, 124, 126, 128.

Cache 115 may include temporary storage for information referencing stored objects that were recently accessed from or stored in a storage node in communication with gateway computing device 100. Cache 115 may be maintained in storage medium 120 or in a different storage medium accessible to gateway computing device 100.

In operation, cache 115 may store a plurality of cache entries and, in each cache entry, store an identifier of an object and a corresponding storage location. The object identifier may be any sequence of characters that is suitable for uniquely identifying a particular object stored in the storage system. For example, the identifier may be a cryptographic hash generated based on the contents and/or metadata of a given object. The storage location may be any information that is sufficient to identify a particular storage node and a corresponding storage location within the node. For example, the storage location may include an identifier of the particular storage node that maintains the object, an identifier of a storage device within that node, and/or a the path and filename.

In some embodiments, each entry in cache 115 may also store a timestamp, which may correspond to the time at which the corresponding object was originally stored in the identified storage node, was last updated by gateway 100, or was last accessed by gateway 100. In such embodiments, cache 115 may be configured to maintain cache data for a given window of time by periodically removing items for which a corresponding retention policy has expired. For example, if the retention policy of cache 115 is set to maintain two hours of data, cache 115 may periodically inspect the entries and remove any entries with timestamps older than two hours. Such embodiments are useful in ensuring that cache 115 maintains data that improves the efficiency of the system, while simultaneously limiting the total amount of storage space occupied by cache 115.

Machine-readable storage medium 120 may be any electronic, magnetic, optical, or other physical storage device that contains or stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions 122, 124, 126, 128 for receiving and transmitting cache update and delete messages. In this manner, gateway computing device 100 may maintain cache coherency between cache 115 and caches maintained in other gateway computing devices in communication with gateway 100.

When gateway computing device 100 performs an operation that requires a modification of cache 115 to add or update an entry, cache entry updating instructions 122 may update the cache to include an object identifier and a corresponding object location that identifies the storage location of the actual object data. For example, when gateway 100 stores a new object in a given storage node, gateway 100 may update the cache to include the object identifier and the storage location of the object in the storage node. Similarly, after gateway 100 performs a lookup operation to identify the storage location of an object for which a local cache entry does not exist, gateway 100 may update the cache to include the identifier and the storage location provided to gateway 100 by the storage node. In embodiments in which entries in cache 115 include timestamps, instructions 122 may also add the timestamp to the new or updated cache entry.

After updating the cache as necessary, gateway computing device 100 may then trigger update message instructions 124 to transmit a cache update message to the other gateway devices in the system, such that the caches remain consistent. For example, update message instructions 124 may transmit an update message using a simple multicast transport protocol to the other gateway devices. The update message may include the object identifier and the corresponding storage location and may instruct the other gateway devices to add the identifier and location to their respective caches.

In a system including a number of gateways 100 with corresponding caches, a cache miss due to an out-of-date cache imposes only a slight performance impact, since each gateway can locate the object identifier in the storage nodes using a lookup operation. As a result, gateway 100 uses a simple or unreliable multicast transport protocol for the update messages, such that gateway 100 only transmits the message once to the other gateway devices that belong to the multicast group. Gateway 100 and the network used for transmission of the update messages therefore do not incur the additional expense associated with retransmission of a multicast message that is not received by the intended recipients.

Conversely, when gateway computing device 100 receives a cache update message from another gateway computing device, update message instructions 124 may initially receive the simple multicast message from the transmitting gateway. In response, cache entry updating instructions 122 may extract the object identifier and object location included in the message and update the local cache 115 to include an entry with the extracted information. In embodiments in which cache 115 maintains timestamps, updating instructions 122 may also add a timestamp to the cache entry corresponding to the time the object was stored, accessed, or updated.

When gateway computing device 100 performs an operation that requires an update of cache 115 to remove an entry, cache entry removing instructions 126 may remove the cache entry, including the object identifier and the corresponding object location. For example, when a cache entry expires pursuant to a retention policy of the cache 115 or a retention policy of a storage node, removing instructions 126 may remove the cache entry. Similarly, when gateway 100 receives an instruction from a user or an agent to delete an object, gateway 100 may instruct the appropriate storage node to delete the object and may then remove the corresponding entry from cache 115.

After updating the cache 115 to remove an entry, gateway computing device 100 may then trigger delete message instructions 128 to transmit a cache delete message to the other gateway devices in the system, such that the caches remain consistent. For example, delete message instructions 128 may transmit an update message using a reliable multicast transport protocol to the other gateway devices. The delete message may include the object identifier and may instruct the other gateway devices to remove the identifier and the storage location from their respective caches.

In a system including a number of gateways with 100 corresponding caches, a false positive match can result in a significant performance impact, as the gateway 100 will attempt to access a nonexistent object or access an object at an incorrect location. As a result, pursuant to the reliable multicast protocol, gateway 100 may retransmit the multicast message as necessary to ensure eventual delivery of the message to all gateways that are members of the multicast group.

It should be noted that the particular reliable multicast protocol may vary by embodiment. To name a few examples, the protocol may be SMART Multicast, NACK-Oriented Reliable Multicast Protocol (NORM), Pragmatic General Multicast (PGM), Scalable Reliable Multicast (SRM), or the Java Reliable Multicast Service (JRMS). The particular methodology for ensuring delivery of the cache delete message may vary depending on the particular protocol used. For example, some reliable multicast protocols rely on the receiving devices to transmit negative acknowledgement (NAK) messages when a transmission error occurs, such that the transmitting device may retransmit the message upon receipt of the NAK. Other protocols rely on positive acknowledgement (ACK) messages, in which the receiving devices transmit an ACK upon receipt of each packet or set of packets. Other protocols rely on a combination of NAK and ACK messages or use other types of messages.

Conversely, when gateway computing device 100 receives a cache delete message from another gateway computing device or from a storage node, delete message instructions 128 may initially receive the reliable multicast message from the transmitting device. Delete message instructions 128 may then transmit a NAK or ACK message as necessary depending on the particular reliable multicast protocol in use. Furthermore, in response to receipt of the cache delete message, cache entry removing instructions 126 may extract an object identifier from the message and remove the corresponding cache entry from cache 115.

Figure 2A:
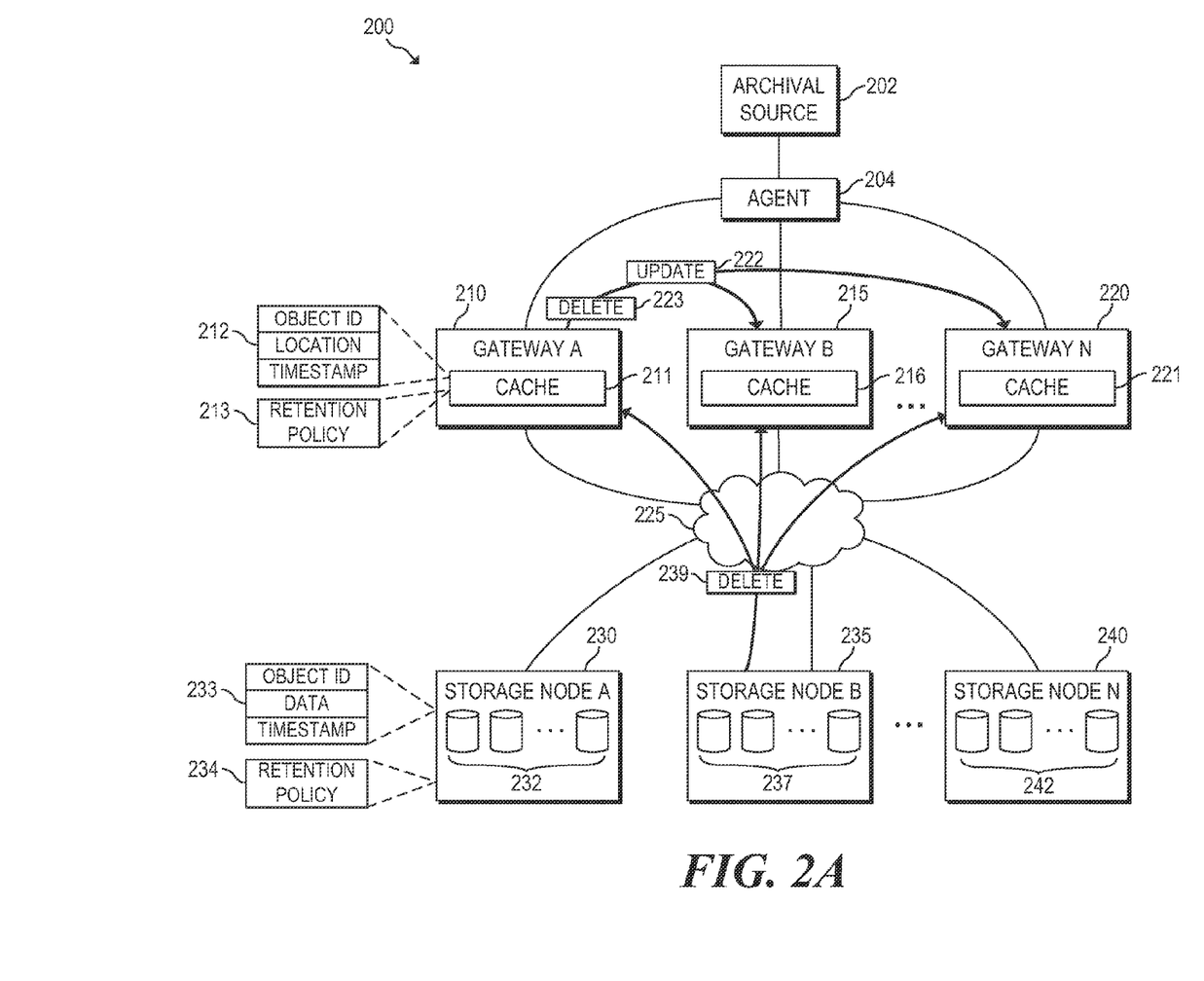
FIG. 2A is a block diagram of an example system including a plurality of gateway computing devices that maintain caches of object location information corresponding to object data maintained on a plurality of storage nodes.

FIG. 2A is a block diagram of an example system 200 including a plurality of gateway computing devices 210, 215, 220 that maintain caches 211, 216, 221 of object location information corresponding to object data maintained on a plurality of storage nodes 230, 235, 240. As illustrated, system 200 may include an archival source 202, an agent 204, a plurality of gateways 210, 215, 220, and a plurality of storage nodes 230, 235, 240.

Archival source 202 may be any computing device that generates data or otherwise has access to data to be stored in storage nodes 230, 235, 240. For example, archival source 202 may be a server, a workstation, a desktop computer, a laptop computer, a mobile computing device, or any other computing device. As one specific example, archival source 202 may be an email server, such as a Microsoft Exchange server or a Lotus Domino server. In such embodiments, storage nodes 230, 235, 240 may be used to archive, backup, or otherwise maintain copies of emails received from archival source 202. It should be noted that, although only one archival source 202 is illustrated, system 200 may include a plurality of such archival sources.

Agent 204 may be any computing device configured to serve as an intermediary between archival source 202 and gateways 210, 215, 220. For example, agent 204 may receive requests to store data in storage nodes 230, 235, 240 and, in response, may process and forward the request to one or more of the gateways 210, 215, 220. It should be noted that, in some embodiments, archival sources 202 may communicate directly with the gateways 210, 215, 220, rather than through agent 204. In addition, although only one agent 204 is illustrated, system 200 may include a plurality of such agents.

To process access and storage requests from agent 204, system 200 may include a plurality of gateways 210, 215, 220, each of which may be configured similarly to gateway 100 of FIG. 1. As illustrated, each gateway 210, 215, 220 may include a respective cache 211, 216, 221 to maintain information that can be used to quickly identify a storage location of a given object within storage nodes 230, 235, 240. For example, as illustrated in FIG. 2A and detailed above in connection with cache 115 of FIG. 1, cache 211 may store a set of data 212 that includes, for each entry, an object identifier, an object location, and a timestamp. Cache 211 may also include a retention policy 213 that specifies a duration of time for which cache 211 maintains data. As also detailed above in connection with cache 115 of FIG. 1, gateway A 210 may periodically enforce retention policy 213 by removing cache entries with timestamps older than the specified duration of time.

In addition, to provide storage capability, system 200 may include a plurality of storage nodes 230, 235, 240, each of which is in communication with each gateway 210, 215, 220 via network 225. Each node 230, 235, 240 may include one or more storage devices 232, 237, 242 for storage of data. Each storage device 232, 237, 242 may be a hard disk drive, a solid state drive, a hybrid drive, a tape drive, a nanodrive, a holographic storage device, or any other hardware device capable of storing data for subsequent access.

Each storage device 232 may maintain a set of data 233 that includes, for each entry, an object identifier, object data, and a timestamp. In contrast to the caches 211, 216, 221, each storage device 232, 237, 242 maintains actual object data. For example, when system 200 is utilized as an email archiving platform, each storage device 232, 237, 242 maintains copies of emails, while caches 211, 216, 221 maintain pointers to the actual storage location of the emails on storage nodes 230, 235, 240.

As with the caches 211, 216, 221, the storage devices 232, 237, 242 may also be associated with a retention policy 234. The retention policy 234 may specify a period of time for which each device 232, 237, 242 is to maintain a copy of the actual object data. Thus, each node 230, 235, 240 may periodically enforce retention policy 234 by removing object data for objects with corresponding timestamps that are older than the time period specified in the retention policy 234.

In operation, gateways 210, 215, 220 and storage nodes 230, 235, 240 may exchange multicast messages to ensure that caches 211, 216, 221 include up-to-date information that remains consistent between the caches. For example, each gateway 210, 215, 220 may distribute a cache update message to the other gateways when the particular gateway adds or updates a given cache entry. Thus, as illustrated, when gateway A 210 adds or updates a cache entry to cache data 212, gateway A 210 may distribute an update message 222 to each of the other gateways 215, 220 using a simple multicast transport protocol, such that update message 222 is only transmitted once. Two example methods in which a gateway 210, 215, 220 transmits an update message using a simple multicast transport protocol are described below in connection with FIGS. 3 and 4.

In addition to update messages, the components of system 200 may also exchange delete messages 223, 239. For example, each gateway 210, 215, 220 may distribute a cache delete message to the other gateways when the particular gateway removes a cache entry. Thus, as illustrated, when gateway A 210 removes a cache entry from cache data 212, gateway A 210 may distribute a delete message 223 to each of the other gateways 215, 220 using a reliable multicast transport protocol. As a result, in some situations, gateway A 210 may retransmit the delete message 223 to ensure that each of the other gateways receives the message. An example method in which a gateway 210, 215, 220 transmits a delete message using a reliable multicast transport protocol is described below in connection with FIG. 5.

As another example, each storage node 230, 235, 240 may distribute a cache delete message to the gateways 210, 215, 220 when the particular storage node removes an object. Thus, as illustrated, when storage node B 235 removes an object from storage, storage node B 235 may distribute a delete message 239 to each of the gateways 210, 215, 220 using a reliable multicast transport protocol. As a result, in some situations, storage node B 235 may retransmit the delete message 239 to ensure that each of the gateways receives the message. An example method in which a storage node 230, 235, 240 transmits a delete message using a reliable multicast transport protocol is described below in connection with FIG. 6.

Figure 2B:
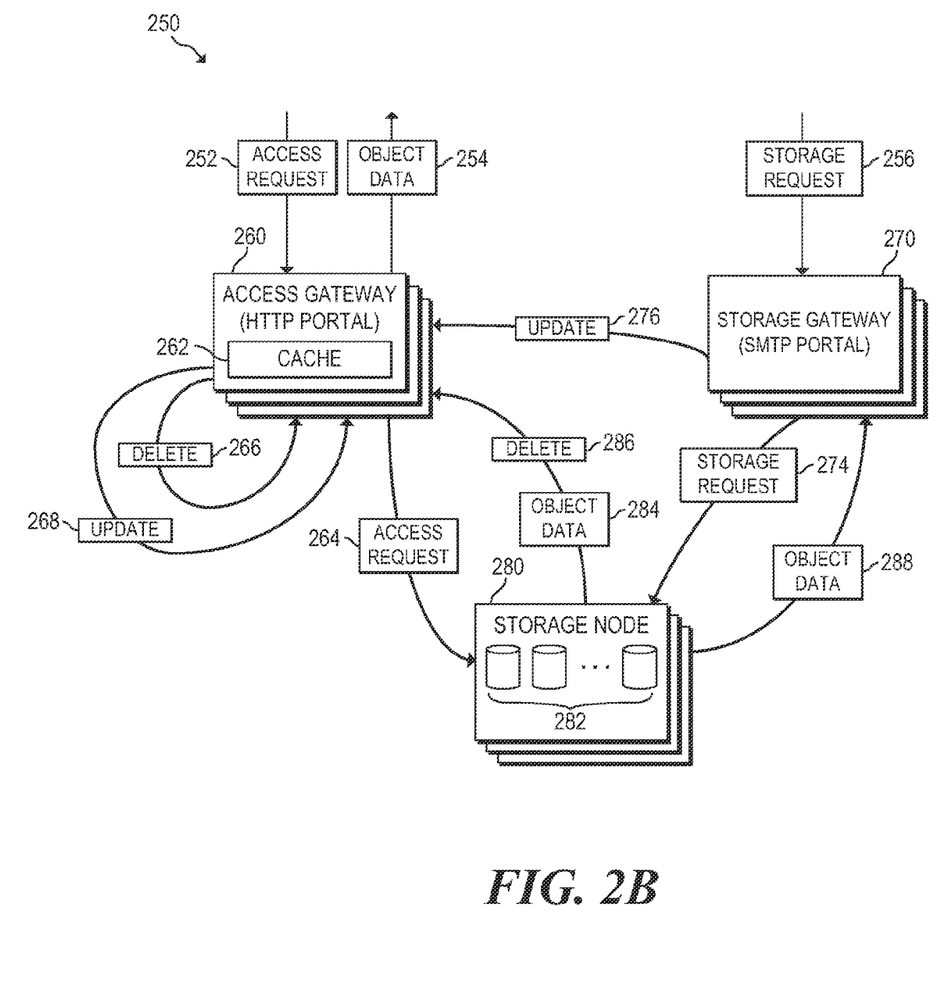
FIG. 2B is a block diagram of an example system including access gateways, storage gateways, and storage nodes in communication to maintain caches of object location information in the access gateways.

FIG. 2B is a block diagram of an example system 250 including access gateways 260, storage gateways 270, and storage nodes 280 in communication to maintain caches 262 of object location information in the access gateways 260. In contrast to system 200 of FIG. 2A, system 250 includes dedicated access gateways 260 and storage gateways 270. Thus, whereas each gateway 210, 215, 220 of FIG. 2A processes both access and storage requests, in system 250, these requests are divided between access gateways 260 and storage gateways 270, respectively.

Access gateways 260 may each be computing devices configured to receive and process access requests 252 and, in response, return object data 254. For example, each access gateway 260 may receive access requests 252 from an agent device, an archival source, or from a user's computing device, forward the request 264 to one or more storage nodes 280, and return the retrieved object data 254. In some embodiments, each access gateway 260 is a Hypertext Transfer Protocol (HTTP) portal that responds to HTTP access requests, thereby allowing users to access system 250 using a web-based interface.

As illustrated, each access gateway 260 may include a cache 262 for storing object location data regarding the objects maintained in the storage nodes 280. For example, as described above in connection with cache 115 of FIG. 1 and cache 211 of FIG. 2A, the cache may maintain, for each entry, an object identifier, object location data, and a timestamp.

In operation, upon receiving a request 252 to read an existing object that includes an object identifier, access gateway 260 may first determine whether the object identifier is located in cache 262. If so, access gateway 260 may determine the corresponding location included in the entry in cache 262, transmit an access request 264 to access the location in one of the storage nodes 280, receive object data 284 from the storage node 280, and return the data as object data 254 to the requesting device.

In contrast, if the object identifier included in a request 252 to read an object is not included in cache 262, access gateway 260 may execute a lookup operation to determine the storage location of the object. For example, access gateway 260 may transmit a request 264 to each storage node 280 requesting that the storage node that is storing the object return the corresponding object data 284. Upon receiving the object data 284 from a storage node 280, access gateway 260 may return object data 254 to the requesting device and update cache 262 to include the object identifier and the corresponding storage location. Finally, access gateway 260 may distribute a simple multicast update message 268 to the other access gateways instructing the gateways to update their respective caches to include the object identifier and the corresponding object location.

Similarly, in response to receiving a request 252 to delete an object, access gateway 260 may first determine whether the included object identifier is located in cache 262. If so, access gateway 260 may determine the corresponding location included in the entry in cache 262 and transmit a request 264 to the appropriate storage node 280 instructing the node 280 to remove the identified object. Access gateway 260 may then remove the entry from cache 262 and transmit a multicast delete message 266 to the other access gateways using a reliable multicast protocol. Alternatively, when an entry corresponding to the included object identifier is not included in cache 262, access gateway 260 may simply transmit the delete request to all storage nodes 280.

Storage gateways 270 may each be computing devices configured to receive requests 256 to store object data and, in response, to forward storage requests 274 to storage nodes 280. In some embodiments, each storage gateway 270 is a Simple Mail Transfer Protocol (SMTP) portal that stores email messages in storage nodes 280. In such embodiments, the SMTP portal may be configured to transmit update messages 276 upon storage of a given email message in a particular storage node 280.

In operation, upon receipt of a request 256 to store an object in system 250, storage gateway 270 may forward the storage request 274 to one of the storage nodes 280. The storage node 280 may be selected randomly or based on a round-robin selection, to name a few examples. The storage node 280 may then store the received object in one of its storage devices 282 and return object data 288, which may include information identifying the storage location of the object. In response, storage gateway 270 may transmit a simple multicast update message 276 including the object identifier and object location to each of the access gateways 260. In response to receipt of the update message 276, each access gateway 260 may update a respective cache 262 to include the object identifier and object location.

Storage nodes 280 may each be computing devices configured to receive access requests 264 from access gateways 260 and storage requests 274 from storage gateways 270. Each storage node 280 may include one or more storage devices 282, which may any hardware devices capable of storing data for subsequent access.

In addition to processing access requests 264 and storage requests 274 as described above, each storage node 280 may also be configured to enforce a retention policy. The retention policy may specify a period of time for which each device 282 is to maintain a copy of the object data. To enforce the retention policy, storage device 282 may periodically remove object data for objects with timestamps that are older than the time period specified in the retention policy. Upon removal of an object from a storage device 282 pursuant to an expired retention policy, storage node 280 may transmit a delete message 286 to each of the access gateways 260 using a reliable multicast transport protocol.

FIGS. 3-6, 7A, and 7B are flowcharts of example methods implemented by gateway computing devices and/or storage nodes. Although execution of these methods is described below with reference to particular devices, other suitable devices for execution of these methods will be apparent to those of skill in the art. Each of the methods may be implemented in the form of executable instructions stored on a machine-readable storage medium and/or in the form of electronic circuitry.

Figure 3:
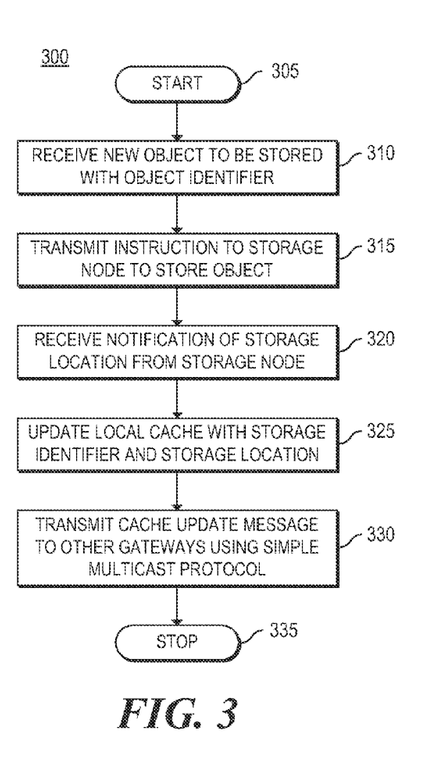
FIG. 3 is a flowchart of an example method implemented by a gateway computing device for responding to a request to store an object.

FIG. 3 is a flowchart of an example method 300 implemented by a gateway computing device for responding to a request to store an object. Method 300 may be implemented by, for example, a gateway 100 of FIG. 1, a gateway 210, 215, 220 of FIG. 2A, or a storage gateway 270 of FIG. 2B.

Method 300 may start in block 305 and continue to block 310, where the gateway may receive a new object to be stored. In some embodiments, the received request may include an object identifier for the object, which may be a hash or other sequence of characters. In other embodiments, the request may include only the object and the gateway may therefore calculate the object identifier upon receipt of the object.

In block 315, the gateway may transmit a request to a given storage node along with the object identifier. In determining the storage node to which the request is to be transmitted, the gateway may, for example, randomly select a node or use a round-robin selection method. Once the particular storage node is selected, the gateway may then transmit the storage request to the selected storage node.

In block 320, after the storage node has stored the new object, the gateway may receive a notification of the storage location at which the object was stored. This location may include, for example, an identifier of the storage node, an identifier of a particular storage device within the node, and/or a storage path within the particular storage device. In block 325, in response to receipt of this information, the gateway may update its local cache to include the storage identifier, the received storage location, and, in some embodiments, a timestamp representing the time at which the object was stored.

Finally, in block 330, the gateway may transmit a cache update message to the other gateways using a simple multicast protocol to ensure that the caches on the gateways remain consistent. The cache update message may include the object identifier and the storage location and may instruct each receiving gateway to add this information to its respective cache. When the gateway is a gateway 210, 215, 220 of FIG. 2A, the gateway may transmit the cache update message to the gateways other than itself. Alternatively, if the gateway is a storage gateway 270 of FIG. 2B, the gateway may transmit the update message to all access gateways 260. Method 300 may then continue to block 335, where method 300 may stop.

Figure 4:
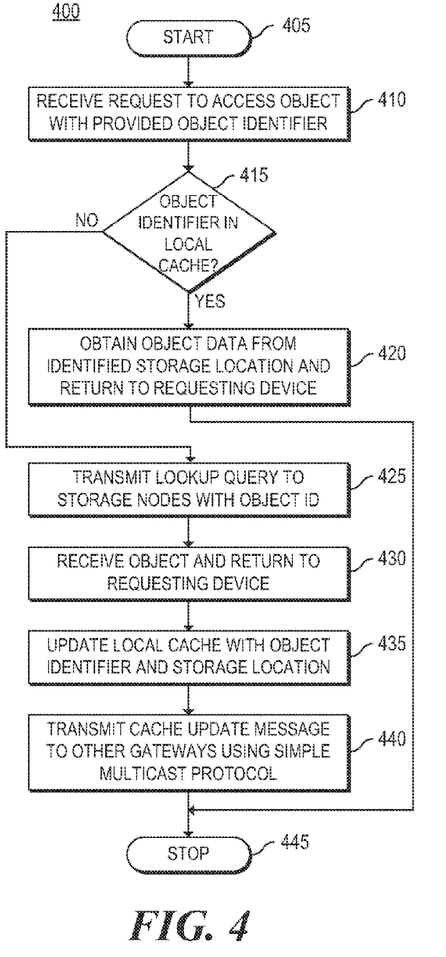
FIG. 4 is a flowchart of an example method implemented by a gateway computing device for responding to a request to access a stored object.

FIG. 4 is a flowchart of an example method 400 implemented by a gateway computing device for responding to a request to access a stored object. Method 400 may be implemented by, for example, a gateway 100 of FIG. 1, a gateway 210, 215, 220 of FIG. 2A, or an access gateway 260 of FIG. 2B.

Method 400 may start in block 405 and continue to block 410, where the gateway may receive a request to access an object with a provided object identifier from an agent or user computing device. In response, in block 415, the gateway may then determine whether the object identifier provided with the request is included in the local cache. If so, method 400 may continue to block 420, where the gateway may determine the object location from the corresponding cache entry, access the object from the identified object location in a given storage node, and return the object to the requesting device. Method 400 may then proceed to block 445, where method 400 may stop.

Alternatively, if it is determined in block 415 that the object identifier is not included in the local cache, method 400 may proceed to block 425. In block 425, the gateway may transmit a lookup query to each of the storage nodes including the object identifier. For example, the gateway may transmit a multicast message to the storage nodes requesting that the storage node that is storing the identified object return the corresponding object data.

In block 430, the gateway may receive the object returned by one of the storage nodes and, in response, may return the object data to the requesting device. In block 435, the gateway may then update the local cache to include the object identifier and the storage location of the object on the storage node. Finally, in block 440, the gateway may transmit a cache update message to the other gateways using a simple multicast protocol, thereby ensuring that the caches in the gateways remain consistent. The cache update message may include the object identifier and the storage location and may instruct each receiving gateway to add this information to its respective cache. Method 400 may then continue to block 445, where method 400 may stop.

Figure 5:
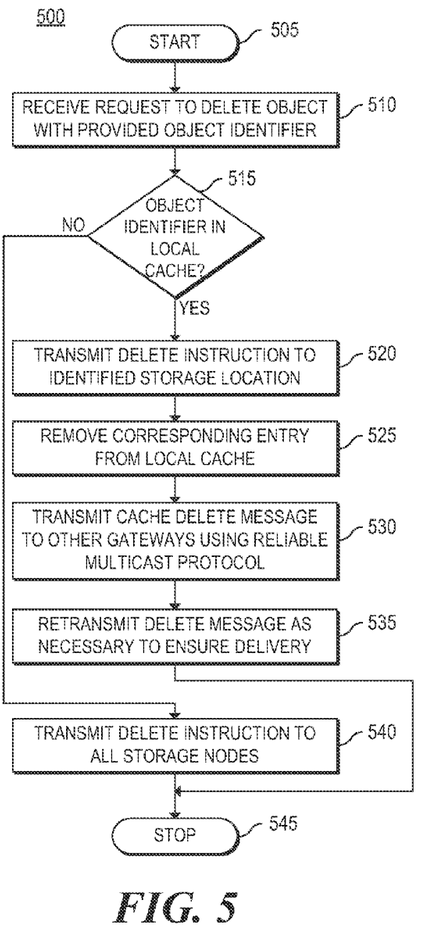
FIG. 5 is a flowchart of an example method implemented by a gateway computing device for responding to a request to delete a stored object.

FIG. 5 is a flowchart of an example method 500 implemented by a gateway computing device for responding to a request to delete a stored object. Method 500 may be implemented by, for example, a gateway 100 of FIG. 1, a gateway 210, 215, 220 of FIG. 2A, or an access gateway 260 of FIG. 2B.

Method 500 may start in block 505 and continue to block 510, where the gateway may receive a request to delete an object with a provided object identifier from an agent or user computing device. In response, in block 515, the gateway may then determine whether the object identifier provided with the request is included in the local cache. If so, method 500 may continue to block 520, where the gateway may determine the object location from the corresponding cache entry and transmit a delete instruction to the storage node identified in the object location data. In block 525, the gateway may then remove the corresponding cache entry from the local cache.

Next, in block 530, to ensure that the caches in all gateways remain consistent, the gateway may transmit a cache delete message to the other gateways using a reliable multicast protocol. The cache delete message may include the object identifier and may instruct each receiving gateway to remove the corresponding cache entry from its respective cache.

After transmitting the delete message, the gateway may begin monitoring for NAK or ACK messages from the other gateways. Thus, in block 535, the gateway may retransmit the delete message as necessary to ensure delivery to each of the other gateways. For example, when using a reliable multicast protocol that relies on NAK messages, upon receipt of a NAK message indicating that delivery of the message failed for a particular gateway, the gateway may retransmit the delete message. Similarly, when using a protocol that relies on ACK messages, the gateway may retransmit the delete message when it fails to receive an ACK from a particular gateway. Other scenarios for retransmitting the delete message will be apparent based on the particular reliable multicast protocol in use. After all other gateways have received the delete message, method 500 may continue to block 545, where method 500 may stop.

Alternatively, if it is determined in block 515 that the object identifier is not included in the local cache, method 500 may proceed to block 540. In block 540, the gateway may transmit a delete instruction to each of the storage nodes including the object identifier. For example, the gateway may transmit a multicast message to the storage nodes requesting that the storage node that is storing the identified object remove the corresponding object data from its storage device. Method 500 may then continue to block 545, where method 500 may stop.

Figure 6:
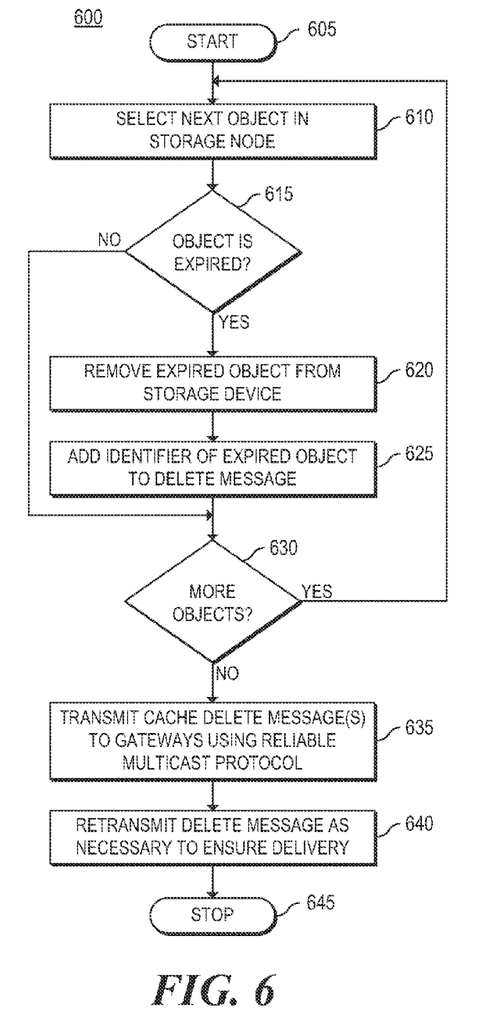
FIG. 6 is a flowchart of an example method implemented by a storage node to enforce an object retention policy.

FIG. 6 is a flowchart of an example method 600 implemented by a storage node to enforce an object retention policy. Method 600 may be implemented by, for example, a storage node 230, 235, 240 of FIG. 2A or a storage node 280 of FIG. 2B. For example, the storage node may periodically execute the procedure detailed below to remove expired objects pursuant to its object retention policy.

Method 600 may start in block 605 and continue to block 610, where the storage node may select a next object maintained in a local storage device for examination. For example, the storage node may begin with an object with an oldest timestamp.

In block 615, the storage node may determine whether the selected object is expired pursuant to the retention policy of the storage node. For example, the storage node may determine the current time and subtract the time window specified by the retention policy from the current time. If the timestamp of the currently-selected object is prior to the current time minus the retention window, the storage node may determine that the given object is expired.

When the object is not expired, method 600 may skip directly to block 630, described in detail below. Alternatively, when the object is expired, method 600 may continue to block 620, where the storage node may remove the expired object from its storage device. Thus, the storage node may delete the object identifier, the object data, and the timestamp from its local storage device. Next, in block 625, the storage node may add the identifier to a list of objects for which cache delete messages are to be transmitted. Method 600 may then continue to block 630.

In block 630, the storage node may determine whether there are additional objects to be inspected. If so, method 600 may return to block 610, where the storage node may select the next object to be examined pursuant to the retention policy. Otherwise, method 600 may continue to block 635.

In block 635, the storage node may transmit one or more cache delete messages to the gateways in the system using a reliable multicast protocol. For example, the storage node may transmit a separate multicast cache delete message for each object identifier added to the list in block 625. Alternatively, the storage node may transmit one or more batch multicast delete messages that include multiple object identifiers to be deleted. As described above in connection with block 535 of FIG. 5, the storage node may then begin monitoring for NAK and ACK messages and, in block 640, may retransmit the delete message(s) as necessary to ensure delivery to each of the gateways. After all gateways have received each delete message, method 600 may continue to block 645, where method 600 may stop.

Figure 7A:
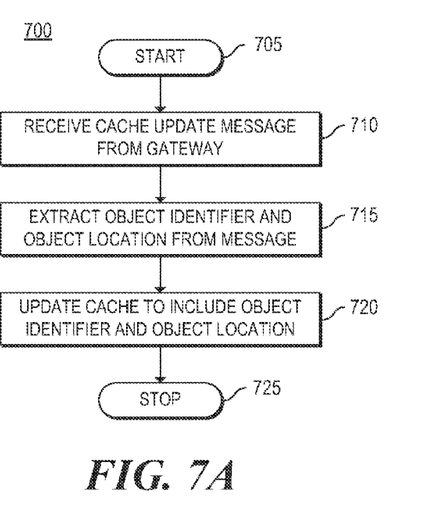
FIG. 7A is a flowchart of an example method implemented by a gateway computing device for receiving and processing an update message transmitted using a simple multicast protocol.

FIG. 7A is a flowchart of an example method 700 implemented by a gateway computing device for receiving and processing an update message transmitted using a simple multicast protocol. Method 700 may be implemented by, for example, a gateway 100 of FIG. 1, a gateway 210, 215, 220 of FIG. 2A, or an access gateway 260 of FIG. 2B.

Method 700 may start in block 705 and continue to block 710, where the gateway may receive a cache update message transmitted by another gateway using a simple multicast transport protocol. In response, in block 715, the gateway may extract the object identifier and object location included in the cache update message.

In block 720, the gateway may update the cache to include the object identifier and object location. For example, when there is not an existing cache entry that includes the object identifier, the gateway may create a new entry in the cache and add the object identifier, location, and, in some embodiments, a timestamp. Alternatively, when there is an existing cache entry that includes the object identifier, the gateway may update the object location and timestamp in the entry. Method 700 may then continue to block 725, where method 700 may stop.

Figure 7B:
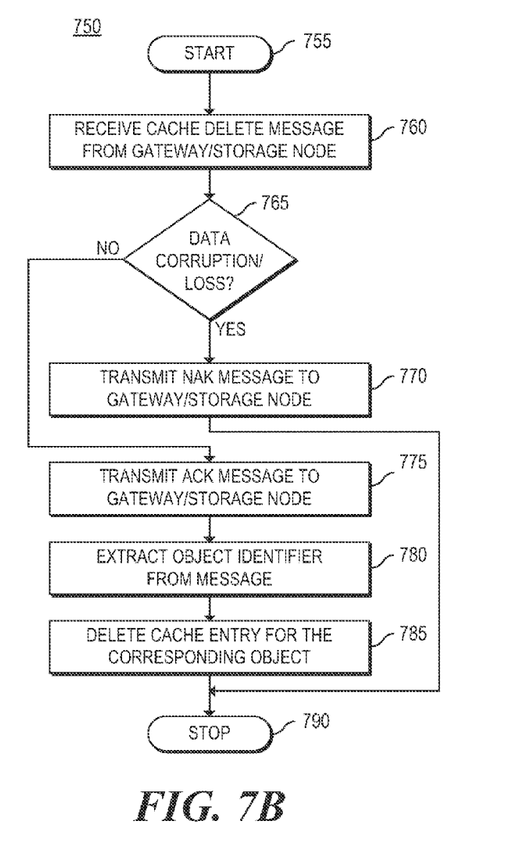
FIG. 7B is a flowchart of an example method implemented by a gateway computing device for receiving and processing a delete message transmitted using a reliable multicast protocol.

FIG. 7B is a flowchart of an example method 750 implemented by a gateway computing device for receiving and processing a delete message transmitted using a reliable multicast protocol. Method 750 may be implemented by, for example, a gateway 100 of FIG. 1, a gateway 210, 215, 220 of FIG. 2A, or an access gateway 260 of FIG. 23.

It should be noted that, although method 750 is illustrated as using both NAK and ACK messages, this may vary depending on the particular reliable multicast protocol. For example, some protocols utilize only NAK messages, while others use only ACK messages. Still other protocols rely on different types of messages to communicate to the transmitting device that a retransmission of a particular message is required.

Method 750 may start in block 755 and continue to block 760, where the gateway may receive a cache delete message transmitted by another gateway or by a storage node using a reliable multicast transport protocol. In response, in block 765, the gateway may determine whether the particular message has experienced data corruption or loss. For example, when using some reliable multicast protocols, the gateway may examine each packet and a sequence identifier included with the packet. When a predetermined number of packets in a row are not received in sequence, the gateway may then transmit a NAK message to the transmitting gateway or storage node. Other techniques for identifying data corruption or loss will be apparent based on the particular reliable multicast transport protocol in use.

When it is determined that the message was not received correctly, method 750 may continue to block 770, where the gateway may transmit a NAK message to the transmitting gateway or storage node indicating that the particular delete message was not properly received. Method 750 may then continue to block 790, where method 750 may stop.

Alternatively, when it is determined in block 765 that the message was properly received, method 750 may continue to block 775, where the gateway may transmit an ACK message to the transmitting gateway or storage node. In block 780, the gateway may extract the object identifier included in the cache delete message and, in block 785, delete the corresponding cache entry. Method 750 may then continue to block 790, where method 750 may stop.

According to the foregoing, example embodiments provide for a gateway-based storage system that allows for efficient deduplication, even in large systems. By using a series of caches distributed over the gateways, each gateway may quickly access objects in the system. Furthermore, because the gateways exchange update and delete messages using simple and reliable multicast messages, respectively, the caches in the gateways remain consistent during operation of the system.

I claim:

1. A gateway computing device for maintaining a cache of object location information, the gateway computing device comprising:
a storage medium to maintain a cache of object location information of objects stored in a storage system; and
a processor to:
receive a request to store a first object in the storage system;
forward the request to the storage system to store the first object;
in response to the first object being stored in the storage system, create a new entry in the cache, wherein the new entry includes an object identifier, a timestamp of the new entry, and a storage location of the first object;
in response to the creation of the new entry in the cache, transmit a cache update message to other gateway computing devices, wherein the cache update message includes information of the new entry and instructions to instruct the other gateway computing devices to add the information of the new entry in respective caches of the other gateway computing devices;
receive a request to access a second object stored in the storage system,
execute a lookup to determine a storage location of the second object in the storage system when a corresponding second object identifier is not located in the cache,
update the cache to include an entry of the second object identifier, a timestamp of the entry, and the storage location of the second object based on the lookup, and
transmit a second update message to the other gateway computing devices, the second update message instructing the other gateway computing devices to add the second object identifier and the storage location of the second object to the respective caches in the other gateway computing devices.

2. The gateway computing device of claim 1, wherein the processor is further to:
receive a delete request including a third object identifier of a third object to be deleted from a storage node in the storage system,
transmit a message instructing the storage node to remove the third object,
remove an entry including the third object identifier and a corresponding third storage location of the third object from the cache, and
transmit a delete message to the other gateway computing devices, the delete message instructing the other gateway computing devices to remove the third object identifier and the third storage location of the third object from the respective caches of the other gateway computing devices.

3. The gateway computing device of claim 1, wherein the new entry in the cache further includes information indicating a time duration that the new entry is to be maintained in the cache according to a retention policy, and wherein the processor is further to:
remove the new entry from the cache at an end of the time duration in accordance with the retention policy.

4. The gateway computing device of claim 2, wherein: the processor is to receive the delete request upon deletion of the third object from the storage system based on an expiration of a retention policy for the third object.

5. The gateway computing device of claim 1, wherein the gateway computing device is a Hypertext Transfer Protocol (HTTP) portal that responds to HTTP access requests.

6. The gateway computing device of claim 1, wherein:
the first gateway computing device is a Simple Mail Transfer Protocol (SMTP) portal.

7. A non-transitory machine-readable storage medium encoded with instructions executable by a processor of a gateway computing device for maintaining a cache of object location information, the non-transitory machine-readable storage medium comprising instructions to:
receive a request to store a first object in a storage system;
forward the request to the storage system to store the first object;
in response to the first object being stored in the storage system, create a new entry in the cache, wherein the new entry includes an object identifier, a timestamp of the new entry, and a storage location of the first object;
in response to the creation of the new entry in the cache, transmit a cache update message to other gateway computing devices, wherein the cache update message includes information of the new entry and instructions to instruct the other gateway computing devices to add the information of the new entry in respective caches of the other gateway computing devices;
receive a request to access a second object stored in the storage system;
execute a lookup to determine a storage location of the second object in the storage system when a corresponding second object identifier is not located in the cache;
update the cache to include an entry of the second object identifier, a timestamp of the entry, and the storage location of the second object based on the lookup; and
transmit a second update message to instruct the other gateway computing devices to add the second object identifier and the storage location of the second object to the respective caches in the other gateway computing devices.

8. The non-transitory machine-readable storage medium of claim 7, further comprising instructions to remove, from the cache, an entry associated with a third object in response to a removal of the third object from the storage system.

9. A method for maintaining a local cache of object location information in a gateway computing device, the method comprising:
receiving a request to store a first object in a storage system;
forwarding, by a processor of the gateway computing device, the request to the storage system to store the first object;
creating, by the processor, a new entry in the local cache, wherein the new entry includes an object identifier, a timestamp of the new entry, and a storage location of the first object;
in response to the creation of the new entry in the local cache, transmitting a cache update message to other gateway computing devices, wherein the cache update message includes information of the new entry and instructions to instruct the other gateway computing devices to add the information of the new entry in respective caches of the other gateway computing devices;
receiving a request to access a second object stored in the storage system;

executing a lookup to determine a storage location of the second object in the storage system when a corresponding second object identifier is not located in the local cache;

updating the local cache to include an entry of the second object identifier, a timestamp of the entry, and the storage location of the second object based on the lookup; and transmitting a second update message to instruct the other gateway computing devices to add the second object identifier and the storage location of the second object to the respective caches in the other gateway computing devices.

10. The method of claim 9, further comprising:

deleting an entry associated with a third object from the local cache in response to removal of the third object from the storage system in communication with the gateway computing device.

11. The method of claim 9, further comprising:

receiving an update message transmitted by one of the other gateway computing devices when an entry associated with a third object is stored in a cache of the other gateway computing device; and adding a third object identifier identifying the third object and a third object location identifying a location in the storage system where the third object is stored, to the local cache in the gateway computing device in response to receiving the second update message.

12. The method of claim 9, further comprising:

receiving a delete message transmitted by a storage node of the storage system when a third object is deleted from the storage node per an expiration of an object retention policy for the third object; and removing an entry including a third object identifier identifying the third object and a third object location identifying a location in the storage system where the third object is stored, from the local cache in the gateway computing device in response to receiving the delete message.

* * * * *